United States Patent [19]

Garceau

[11] Patent Number: 5,253,843
[45] Date of Patent: Oct. 19, 1993

[54] RETRACTABLE-GASKET VALVE HAVING TWO STIFFNESSES

[75] Inventor: Patrick Garceau, Saint Marcel, France

[73] Assignee: Societe Europeenne de Propulsion, Suresnes, France

[21] Appl. No.: 990,331

[22] Filed: Dec. 10, 1992

[30] Foreign Application Priority Data

Dec. 27, 1991 [FR] France .................. 91 16263

[51] Int. Cl.⁵ .................................. F16K 5/20
[52] U.S. Cl. ........................... 251/159; 251/163
[58] Field of Search ................ 251/159, 160, 163

[56] References Cited

U.S. PATENT DOCUMENTS

| | | |
|---|---|---|
| 4,676,480 | 6/1987 | Garceau et al. .......... 251/159 |
| 4,738,431 | 4/1988 | Perkins ................. 251/188 |

FOREIGN PATENT DOCUMENTS

| | | |
|---|---|---|
| 2202572 | 5/1974 | France . |
| 2330932 | 6/1977 | France . |

*Primary Examiner*—John C. Fox
*Attorney, Agent, or Firm*—Weingarten, Schurgin, Gagnebin & Hayes

[57] ABSTRACT

The retractable-gasket ball valve includes sealing means fixed on the valve body, and including, in particular, a gasket for providing sealing between the shutter member and the valve body when the shutter member is in a closed position, and further including a slide for causing said sealing means to move between a retracted position which is also a rest position in which the sealing means is spaced spart from the spherical shutter member, and a contact position in which the gasket is pressed against the shutter member. The valve includes a first resilient element of low stiffness which tends to separate the sealing means from the shutter member when the valve is brought to its open position, and a second resilient element of relatively greater stiffness which is put under tension by the slide a few degrees before the mechanical closure position of the valve when the gasket is in contact with the shutter member, and which exerts control pressure on said gasket in contact with the shutter member.

18 Claims, 4 Drawing Sheets

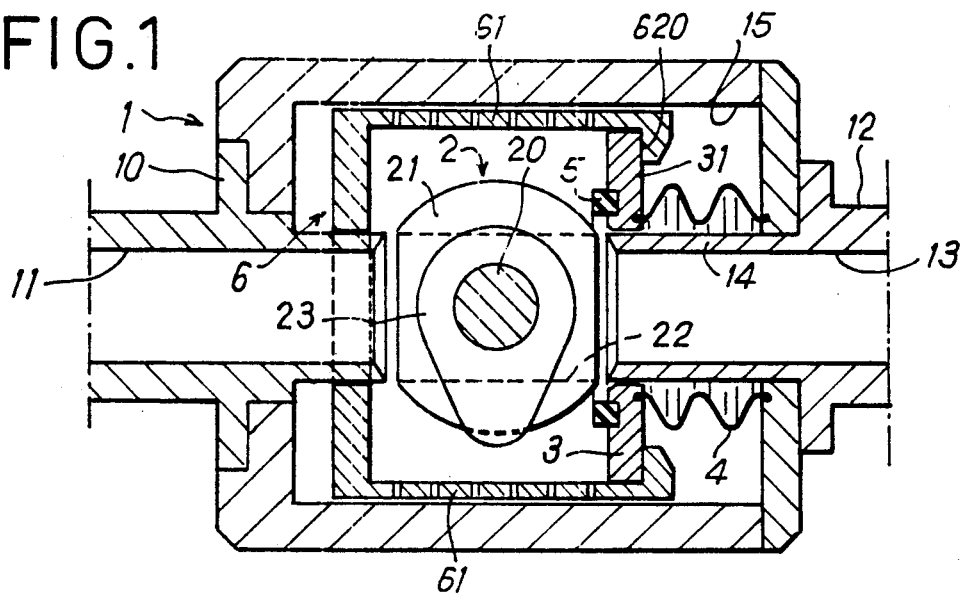
FIG.1
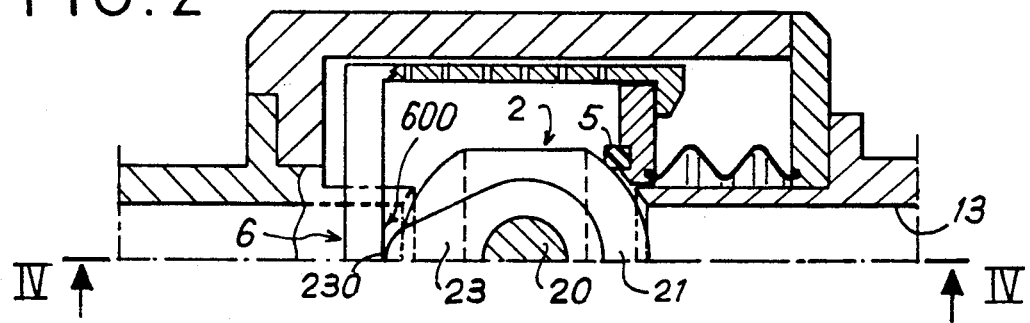
FIG.2
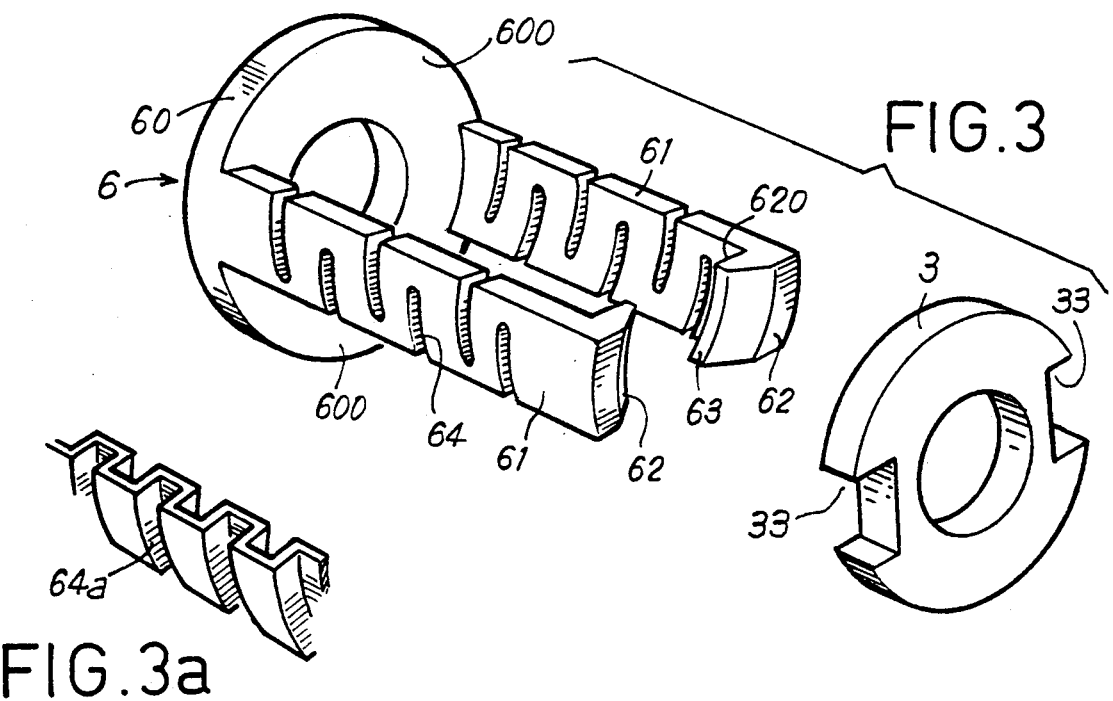
FIG.3
FIG.3a 5,253,843

RETRACTABLE-GASKET VALVE HAVING TWO STIFFNESSES

FIELD OF THE INVENTION

The present invention relates to a ball type valve provided with a retractable gasket and designed to enable the flow of a fluid flowing in a duct to be interrupted, inparticular in a cryogenic environment.

PRIOR ART

In conventional devices, sealing between the ball and the body of the valve is provided by a gasket that co-operates continuously with both elements regardless of the position of the valve. Unfortunately, that configuration suffers from the drawback of applying force to the gasket continuously, thereby giving rise to premature wear thereof.

To remedy that, U.S. Pat. No. 4,676,480 describes a valve in which the shutter member is associated with gasket retraction means that are disposed both upstream and downstream from the shutter member and that are designed to produce both retraction forces and sealing. That valve has the advantage of completely releasing the shutter member from any friction other than over a short stroke in the vicinity of closure. Nevertheless, the resulting assembly is complex, taking up a considerable amount of space, and requiring very onerous handling, particularly when the shutter member is to be removed.

OBJECT AND BRIEF DESCRIPTION OF THE INVENTION

The present invention seeks to remedy the above-mentioned drawbacks and to provide a retractable-gasket valve in which the gasket-retraction means take up only a small amount of volume while nevertheless allowing very large contact forces to be employed, and while still being easy to assemble and to adjust.

These objects are achieved by a retractable-gasket ball valve, the valve being of the type comprising a valve body defining a segment of upstream duct and a segment of downstream duct, a spherical shutter member having a calibrated opening and movable between an open position and a closed position, and vice versa, sealing means fixed on the valve body and including, in particular, a gasket for providing sealing between the shutter member and the valve body when the shutter member is in its closed position, and a slide for causing said sealing means to move between a retracted position, which is also a rest position in which the sealing means is spaced apart from the spherical shutter member, and a contact position in which the gasket is pressed against the shutter member.

According to the invention, the valve includes a first resilient element of low stiffness which, when the valve is brought to its open position tends to separate the sealing means from the shutter member, and a second resilient element of relatively greater stiffness which is put under tension by the slide a few degrees before the mechanical closure position of the valve when the gasket is in contact with the shutter member, and which exerts controlled pressure on said gasket in contact with the shutter member.

The device made in this way makes it possible in a minimum amount of volume and with appreciable mass saving to generate a gasket closure force that is large, having a value that is easily adjusted by acting on the relative positions of the slide and of the sealing means where they are secured to each other.

In a first embodiment, the sealing means includes a gasket support receiving the annular gasket and connected to the valve body by the low stiffness first resilient element whose action in the longitudinal direction of the upstream and downstream ducts tends to separate the gasket from the shutter member and which simultaneously provides sealing between the gasket support and the valve body.

Advantageously, the high stiffness second resilient element is integrated in the slide. In which case, the slide may include a first ring extended axially by two resilient arms of relatively high stiffness extending in the longitudinal direction of the upstream and downstream ducts and on either side of the ball, and having free ends that are terminated by hooks, the inside faces of said hooks being designed to co-operate with the rear end of the gasket support.

Typically, the gasket support is provided with notches for co-operating with the hooks to form an assembly of the bayonet type for the purpose of enabling the slide to act on the gasket support.

In a variant embodiment, the slide may include a first ring which is axially extended by two resilient arms of relatively greater stiffness extending in the longitudinal direction of the upstream and downstream ducts and on either side of the ball, and having free ends connected to a second ring having a threaded inside portion designed to co-operate with a threaded outside portion of the gasket support.

The resilient arms of the slide may include notches extending substantially parallel to the axis of a shaft for rotating the ball and opening out alternately into opposite top and bottom edges of the arms.

As a variant, the resilient arms of the slide may comprise corrugations that are crinkled in shape.

Associating the sealing means with the slide either by a fixed link or else merely by contact, and implementing integrated resilient elements of different stiffnesses, avoids any need to use conventional resilient means disposed upstream and downstream from the shutter member, thereby making it possible to provide valves that are more compact.

In another embodiment, the sealing means include a gasket support receiving the annular gasket and connected to the valve body by means of the low stiffness first resilient element, the relatively greater stiffness second resilient element being constituted by a coil spring disposed between the gasket support and hooks formed at the free ends of the two arms of the slide disposed in the longitudinal direction of the upstream and downstream ducts.

The first resilient element may be a resilient bellows whose action in the longitudinal direction of the upstream and downstream ducts tends to separate the gasket from the shutter member while simultaneously providing sealing between the gasket carrier and the valve body.

In another embodiment, the sealing means include a gasket support receiving the annular gasket and connected to a link ring by the relatively greater stiffness second resilient element, the low stiffness first resilient element connecting the valve body to said link ring which is designed to co-operate with the slide.

When the second resilient element is separate from the slide, it may be a resilient bellows that is compressible in the longitudinal direction of the upstream and downstream ducts, or else it may be a resilient bellows of low stiffness and having a coil spring mounted in parallel therewith, such that the assembly constitutes the resilient element of relatively high stiffness. The resilient bellows simultaneously contributes to providing sealing between the gasket support and the valve body.

The resilient bellows co-operating with the same link ring may be constituted by a bellows machined from a single piece and including two elements of different stiffnesses.

That embodiment which makes it possible to integrate the two resilient elements in the same component enlarges the range of adjustments that are possible both in displacement and in force, thereby providing for better optimization of the apparatus, depending on the looked-for quality of sealing.

More precisely, the shutter member is displaced from its open position to its closed position by rotating a drive shaft, at least one cam secured to said shutter member has an end that comes into contact with an inside face of the ring of the slide to move it in a longitudinal direction of the upstream and downstream ducts, thereby stretching the first resilient elements and causing the gasket to be pressed against the shutter member under drive from the second resilient element, whereas when the shutter member is moved from its closed position to its open position, the cam(s), on losing contact with the ring cause the gasket to be retracted from the shutter member under the effect of the first resilient element returning to its initial, rest position.

The slide can thus be displaced by at least one wheel mounted on eccentric bearings carried by the drive shaft.

The valve body may include a plane window perpendicular to the axis of the shaft for rotating the shutter member, thereby enabling the ball to be extracted without requiring the valve to be removed.

This particular configuration of the valve of the invention is particularly advantageous insofar as the operations involved in maintenance, inspection, or repair, and in particular the operations involved in replacing worn parts can be performed when the valve is in its fully open position without there being any need to remove the valve from the line in which it is installed, providing that there is nothing to interfere with displacement of the ball.

BRIEF DESCRIPTION OF THE DRAWINGS

Other characteristics and advantages appear more clearly on reading the following description given with reference to the accompanying drawings, in which:

FIG. 1 is a diagrammatic axial section through a valve of the invention in its open position;

FIG. 2 is a diagrammatic half view in axial section showing the valve of the invention in its closed position;

FIG. 3 is a perspective view of a first embodiment of a slide applicable to a valve of the invention;

FIG. 3a is a fragmentary view of a variant embodiment of a resilient element forming a portion of the slide and applicable to the valve of the invention;

DETAILED DESCRIPTION OF PARTICULAR EMBODIMENTS

Figure 4:
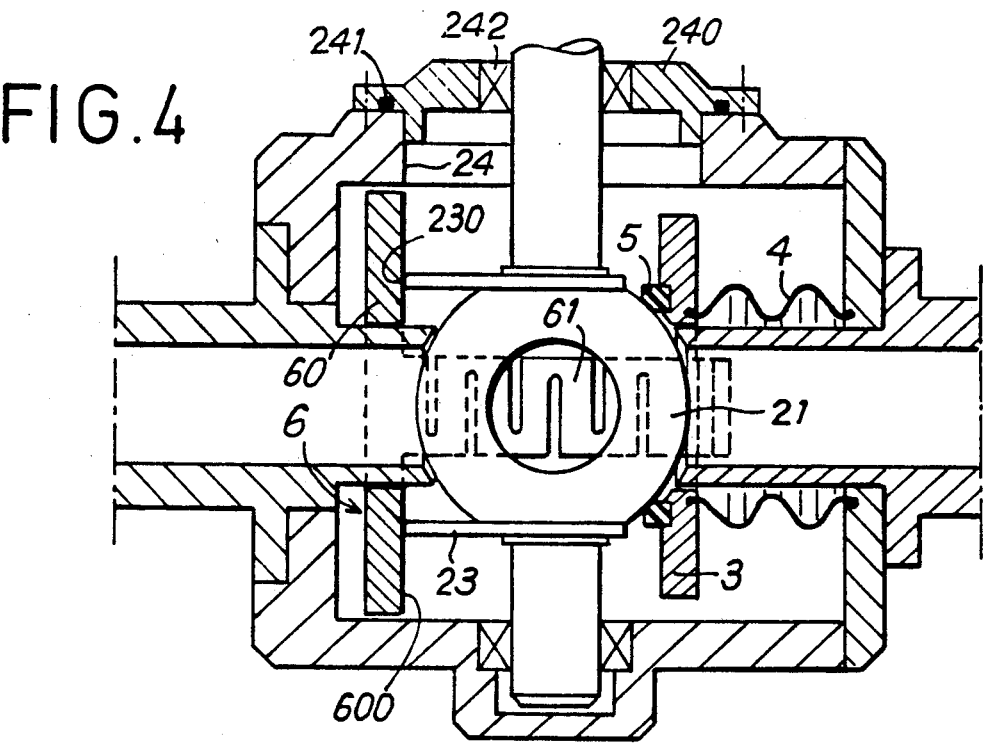
FIG. 4 is a section view on plane IV—IV of FIG. 2 showing the window through which the shutter member can be extracted.

FIGS. 1 and 2 show a first embodiment of a retractable-gasket valve of the invention having two stiffnesses, the valve comprising a valve body 1 with a first portion 10 defining an upstream duct 11 and a second portion 12 defining a downstream duct 13. A shutter member 2 secured to a drive shaft 20 comprises a spherical ball 21 interposed between the upstream duct 10 and the downstream duct 13 in order to interrupt communication between the upstream and downstream ducts when the ball is in a closure position as shown in FIG. 2. By rotating the drive shaft 20, the ball 21 can be moved to an open position in which a calibrated central orifice 22 provides communication between the upstream and downstream ducts.

The second portion 12 of the valve body 1 has a cylindrical wall 14 that separates the downstream duct 13 from an annular cavity 15 which is coaxial about the downstream duct 13 and which is formed in the valve body 1. This cavity contains a gasket support 3 and a resilient bellows 4 connecting said gasket support 3 to the end of the cavity 15 in the valve body 1. The resilient bellows 4 tends to urge the gasket support 3 away from the ball 2, is coaxial about the downstream duct 13, and is capable of being stretched in the longitudinal direction when the gasket support 3 is displaced towards the shutter member 2.

An annular gasket 5 disposed in the gasket support 3 co-operates with the resilient bellows 4 to ensure sealing between the valve body 1 and the shutter member 2 when the gasket is in contact with the ball 21, as shown in the closure position of FIG. 2.

The gasket 5 is brought into contact with the ball 21 by means of a traction member or slide 6 moving in the annular cavity 15 under drive from at least one cam 23 secured to the drive shaft 20 and to the ball 21.

It should be observed that the role of said cam could alternatively be performed by a wheel mounted on an eccentric bearing carried by the drive shaft, as described below.

FIG. 3 is a perspective view of the slide 6 and of the gasket support 3. The slide 6 is in the form of a cylinder, comprising a first ring 60 and axially extended by two resilient arms 61 disposed on diametrically opposite sides of the ball 21 and having free ends that terminate in hooks 62 formed by inwardly-directed walls extending perpendicularly towards the axis of the ring 60. The gasket support 3 advantageously includes two notches 33 in order to facilitate removing the slide along the axis of the valve, said notches 33 and said hooks 62 co-operating to provide a bayonet type of assembly between the slide 6 and the gasket support 3.

The arms 61 may be made resilient by forming slots 64 that extend substantially parallel to the axis of the shaft 20 and that open out alternately into the top and bottom edges of the arm 61. Nevertheless, in order to improve its ability to be elongated and also the force available for obtaining such resilience, it is possible to use corrugations 64a in a crinkled shape, and these may be provided by machining as shown in FIG. 3a. In any event, the resilient arms 61 are advantageously made using a "spring" material.

The slide 6 may be guided using two simple means. The first means as shown for example in FIGS. 1 to 7 provides internal guidance by sliding with a large amount of clearance over the gasket support 3 on the outside of the downstream duct 13, and by the ring 60 (which is then in the form of a disk having a bore) sliding on the outside of the upstream duct 11. In addition, the gasket support 3 must be fitted in the inside diameter of the slide 6 and must come into contact with the arms 61 or else it must be secured to said arms, as described below.

Figure 8:
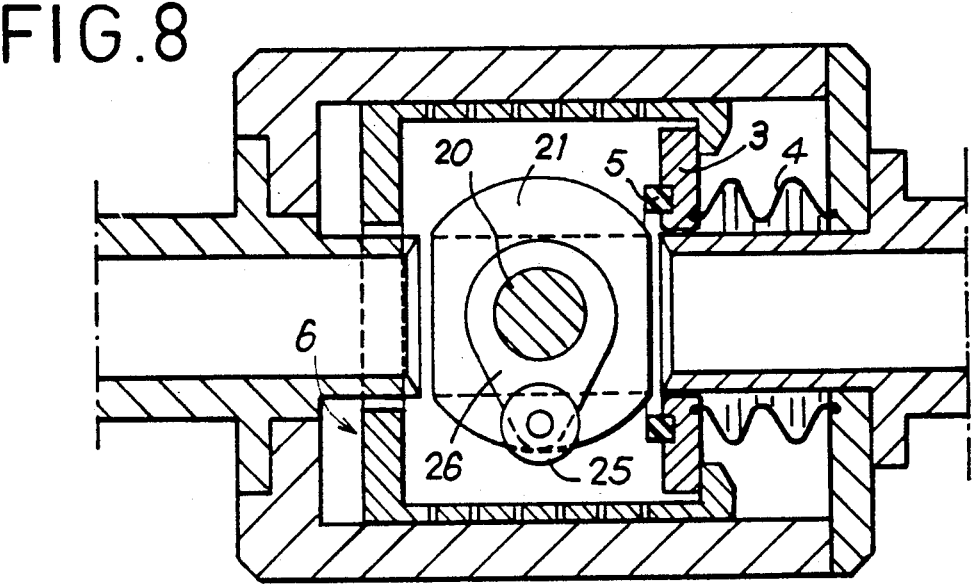
FIG. 8 is a diagrammatic axial section view through a valve constituting a second embodiment of the invention, shown in its open position.
Figure 9:
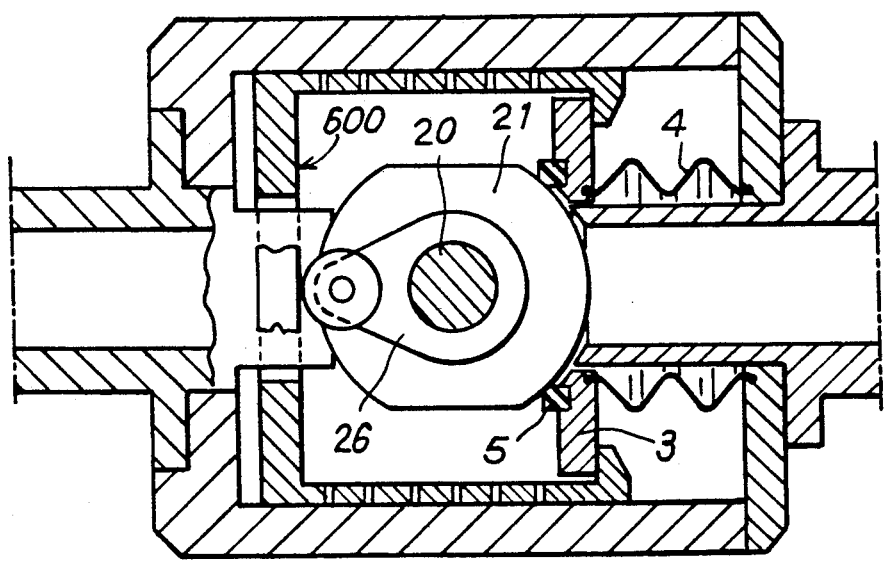
FIG. 9 is a diagrammatic axial section view of the second embodiment valve of FIG. 8, but in its closed position.

The second means is shown, for example, in FIGS. 8 and 9 and consists in external guidance, by the outside diameter of the slide 6 (optionally provided with longitudinal fluting) sliding inside the valve body 1. Under such circumstances, it should be observed that the inside diameter of the ring 60 may be greater than the outside diameter of the upstream duct 11, with the size of the ring then being determined so as to enable the, or each, cam 23 to bear thereagainst.

Whichever kind of assembly is used, clearance must be provided between the gasket support 3 and the outside of the downstream duct 13 (if such a duct exists) in order to allow the gasket 5 to center itself automatically on the ball 21.

With reference again to FIG. 1, it can be seen that when the valve is in its open position, the cam 23 does not make contact with the slide 6 and the gasket 5 is in a retracted position because the slide 6 is not acting on the gasket support 3 and thus is not acting on the resilient bellows 4, which bellows therefore takes up its rest position with only the inside faces 620 of the hooks 62 of the slide 6 bearing against a rear annular end 31 of the gasket support 3. No contact can then prevent the ball 21 from moving, so it is then very easy to remove, upwards or downwards, without there being any need to remove the valve from the line in which it is installed.

FIG. 4 is an axial section on line IV—IV of FIG. 1, showing a window 24 through which the shutter member 2 can be extracted.

The ball 21 is removed through the window 24 which is plane and perpendicular to the axis of the ball, and which is disposed at the top of a bulge in the valve body 1. The window 24 is closed by a cover 240 provided with a sealing member 241 and with a bearing 242 for the shaft of the ball 21. Depending on the configuration implemented, the size of the window varies depending on whether the ball is to be removed on its own or whether it is to be removed together with the slide. Operations involved with maintenance, inspection, or repair can thus be performed in situ, without removing the valve, and in particular worn parts can be replaced, e.g. such as the functional sealing components.

When the valve is placed in its closed position by rotating the drive shaft 20 of the shutter member 2, the cam 23 secured to said shutter member is also rotated and its end 230 then comes to bear against an inside face 600 of the first ring 60 of the slide 6. Under drive from the cam 23, the slide 6 comes into action, i.e. it is moved longitudinally in an upstream direction taking with it the gasket support 3 and thus also the gasket 5 which therefore moves closer to the ball 21.

The stroke is adjusted so that the contact between the gasket and the ball becomes effective a few degrees before the mechanical closure position is reached, with said last few degrees of rotation thus causing the resilient arms 61 of the slide 6 to be stretched. It may be observed that the force applied by said slide 6 on the gasket 5 can be adjusted by interposing a shim of appropriate thickness either between the slide 6 and the end of the cam 23, or else between said slide 6 and the rear end 31 of the gasket support 3. The need in conventional valves to make use of resilient means disposed both upstream and downstream is thus eliminated, such that apparatus of the invention is more compact, i.e. it demonstrates a saving both in mass and in size.

Figure 5:
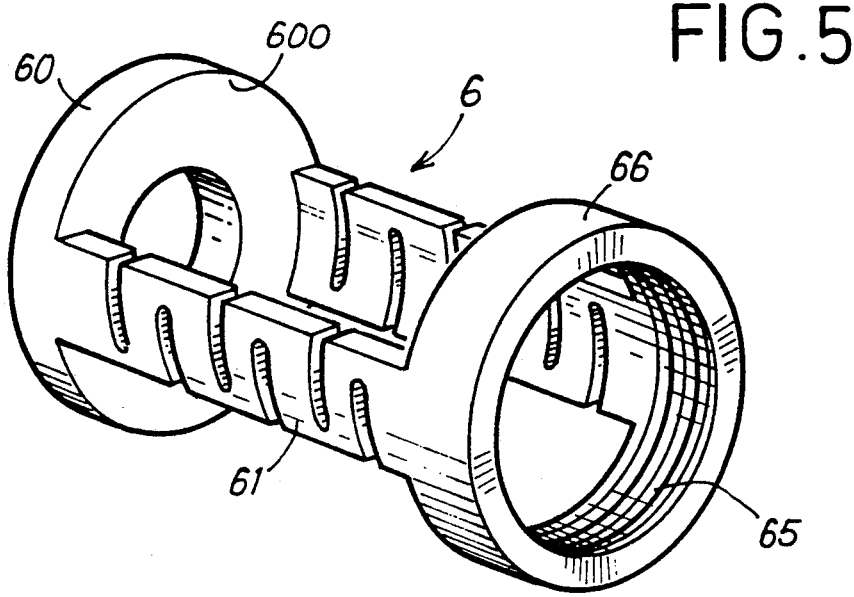
FIG. 5 is a perspective view of a second embodiment of a slide for a valve of the invention.

FIG. 5 shows a variant embodiment of the slide 6. In this embodiment, the connection between the gasket support 3 and slide 6 is stationary and is obtained by means of a screw thread. It should be observed that it would also be possible to make this stationary connection by means of a bayonet type fastener or merely by welding. In any event, screw thread connection has the advantage of making it possible to obtain fine adjustment on the extent to which the gasket is retracted in the open position, and also to adjust the contact force when the valve is in its closed position. In the context of this connection, the gasket support 3 is provided with a first screw thread 32 which co-operates with a second screw thread 65 of the slide 6. The second thread 65 is formed inside the second ring 66 which is placed at the free end of the resilient arms 61, and which is parallel with and concentric to the same-diameter first ring 60 (the hooks 62 being replaced).

There are thus several different ways in which the shutter member 2 and the slide 6 can be installed in the valve body 1, and can be removed therefrom. Thus, it is possible to act along the axis of the valve by removing the downstream portion of the valve and the shutter member shaft, and then inserting or removing the slide 6 and the ball 21, with the ball remaining included inside the slide. It is also possible to act perpendicularly to the valve axis when inserting the slide and the ball, in which case the valve body 1 must possess openings of large dimension such as the window 24 described above. To insert the ball 21 in the slide 6 perpendicularly to the axis of the valve, it is necessary for the inside diameter of the slide to be greater than the outside diameter of the ball, by an amount that takes account of the width of the arms 61, whereas when the ball 21 is inserted into the slide 6 along the axis of the valve, it is necessary for the inside diameters of the rings to be greater than the outside diameter of the ball.

Figure 6:
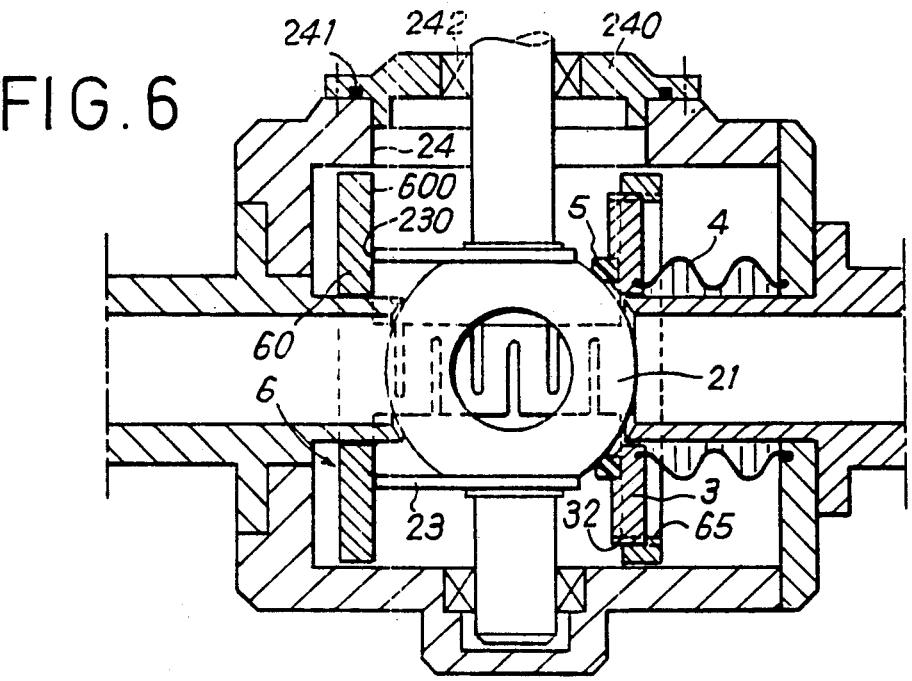
FIG. 6 is a diagrammatic axial section view through a retractable-gasket valve of the invention having two stiffnesses.

The operation of the slide 6 in this variant embodiment is described with reference to FIG. 6 which is a diagrammatic axial section through a valve of the invention in its closed position or nearly in its closed position. Two cams 23 disposed on either side of the ball 21 and secured thereto have their ends 230 bearing against the inside face 600 of the first ring 60 of the slide 6, the gasket 5 being in contact with the ball 21. When the valve is put into its open position by rotating the drive shaft 20, the end 230 of the cam 23 loses contact with the inside face 600 of the first ring 60. Under drive from the energy stored in the bellows 4, the gasket support 3 moves downstream taking the slide 6 with it by means of the screw thread connection 32, 65. The gasket 5 is lifted off the ball 21 and the bellows 4 is at rest in a retracted position.

Figure 7:
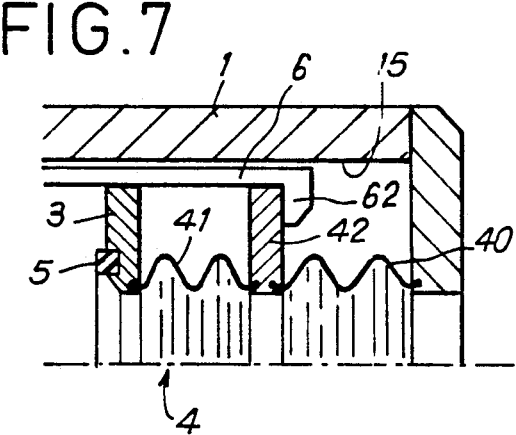
FIG. 7 and FIGS. 7a to 7c are fragmentary section views through the slide and the bellows of several possible variant embodiments of the valve.

FIG. 7 shows another variant embodiment of the slide 6 whose resilient central portion is moved over level with the bellows 4 which thus now has two resilient elements 40 and 41 of different stiffnesses, the slide then being rigid. As for the preceding embodiments, the bellows 4 is coaxial with the downstream duct 13 (not shown) and connects the gasket support 3 to the end of the annular cavity 15 in the valve body 1. The bellows 4 includes a first resilient element 40 of low stiffness that connects the end of the cavity 15 to a link ring 42 which is in turn connected by a second resilient element 41 of relatively greater stiffness to the gasket support 3. The connection with the slide 6 is now provided at the ring 42, and as before it may be provided by means of a threaded connection, by welding, by a bayonet connection, or optionally by contact only (as shown in FIG. 7).

Under such circumstances, it is advantageous for the ring 42 to include at least two notches to allow the hooks 62 of the slide 6 to pass, thereby facilitating assembly of said slide on the axis of the valve.

In the open position of the valve, the two resilient elements 40 and 41 are at rest in the retracted position, and the gasket 5 is not in contact with the ball 21. In practice, this may correspond to a gap of 1 mm for a passage having a diameter of 25 mm, for example. When the valve is placed in its closed position by rotation of the drive shaft 20, the cams 23 press against the slide 6, thereby causing it to move along the valve axis in an upstream direction. Simultaneously, because of the rigid connection between the slide 6 and the ring 42, the resilient element 40 stretches as the gasket 5 moves towards the ball 21. During this initial stage, it should be observed that the second resilient element 41 is inactive and, as mentioned before, the stroke is adjusted so that contact is made between the gasket and the ball a few degrees before the mechanical closure position is reached. Once contact has been made, the second resilient element 41 becomes active and is compressed under traction from the slide 6.

When opening the valve, rotation of the cams 23 releases the slide 6 which moves under drive from the energy stored by the first resilient element 40 which returns to its initial retracted position and moves the gasket 5 away from the ball 21. It may be observed that this operation is not instantaneous since during the first angular degrees while the second resilient element 41 is returning to its initial position, said second element allows said contact to be maintained for a short period.

Figure 7A:
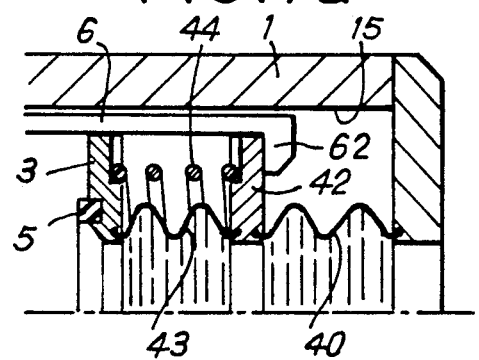

FIG. 7a shows a variant embodiment of the bellows 4 of FIG. 7 in which the two bellows 40 and 43 have identical low-value stiffness, the second resilient element of high stiffness being implemented by a coil spring 44 being put in parallel with the resilient bellows 44 that connects the gasket support 3 to the link ring 42. The coil spring 44 may be placed outside the resilient bellows 43 as shown in FIG. 7a, or alternatively it may be placed inside said bellows 43. In either case, bearing surfaces must be provided for centering the spring on the gasket support 3 and on the ring 42, and in order to ensure that the assembly remains in place, it is necessary for the bellows 43 to exert traction when at rest on the gasket support 3. Similarly, a plurality of springs (at least three) could be fixed between the gasket support and the lind ring around the peripheries thereof, said springs being secured to studs on said components.

Figure 7B:
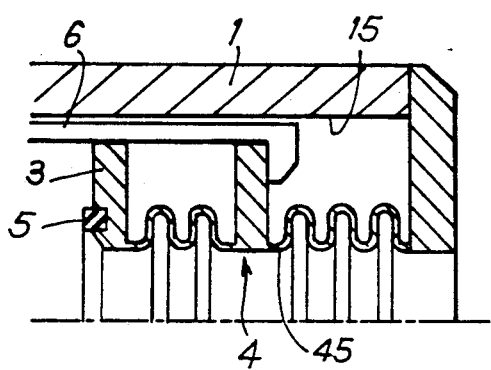

FIG. 7b shows another variant embodiment of the resilient bellows 4 of FIG. 7 which is implemented in the form of a one-piece machined structure having two bellows, a low stiffness bellows 40 and a high stiffness bellows 41, and also having the link ring 42 and possibly also the gasket support 3. This implementation which makes it possible to integrate two different stiffnesses in the same component 45 enlarges the range of possible displacement and force adjustments provided by the invention, and thus makes it possible to obtain better optimization of valve operation, depending on requirements.

Figure 7C:
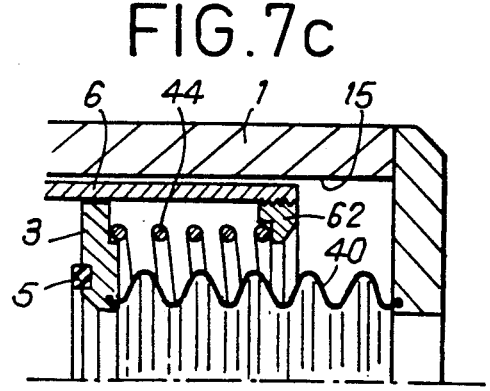

FIG. 7c shows another variant embodiment in which the link ring 42 is omitted, the hook 62 thus acting directly on the coil spring 44 which also carries the gasket support 3 which is connected to the valve body 1 by the low stiffness spring 40. To enable the coil spring to be installed, it is simple to implement either a hook-carrying ring which is screwed into the slide 6 or else a removable outside ring that is screwed onto the gasket support 3. Using screw connections makes it possible to adjust the tension of the spring 44.

FIGS. 8 and 9 show another embodiment of the retractable-gasket valve of the invention in which the cam 23 is replaced by a wheel 25 mounted on an eccentric bearing 26 carried by the drive shaft 20. This assembly operates inexactly the same way as a valve using a cam, but friction between the end 230 of the cam 23 and the inside face 600 of the slide 6 is replaced by the wheel 25 running over said face. It may be observed that as mentioned above, the slide therein is guided externally.

Clearly this valve structure controlled by an eccentric wheel is not specific to this particular embodiment and could be applied equally well to all of the various embodiments described above.

Similarly, the various different embodiments of the first and second resilient members are equally suitable for implementation in the embodimemt of FIGS. 8 and 9.

The retractable-gasket valve of the invention having two different stiffnesses is particularly well suited to a regulation function insofar as no interferring force acts on the shutter member or on the control rod of the shutter member when the valve is in its open position. It is thus possible to adjust the position of the shutter member with a small amount of torque and with great accuracy without gasket wear.

For the purposes of simplification, the above description made with reference to FIGS. 1 to 9 define an upstream duct 11, a downstream duct 13, and a gasket 6 as being disposed on the downstream side of the spherical shutter member 21. Nevertheless, the invention is equally applicable to valves like those shown in FIGS. 1 to 9 but through which fluid flow is in the opposite direction, i.e. for which the duct 11 is the downstream duct, the duct 13 is the upstream duct, and the gasket 5 is disposed on the upstream side of the spherical shutter member 21.

I claim:

1. A retractable-gasket ball valve comprising a valve body defining an upstream duct segment and a downstream duct segment, a spherical shutter member having a calibrated opening and movable between an open position and a closed position, and vice versa, sealing means fixed to the valve body and including, in particular, a gasket for providing sealing between the shutter member and the valve body when the shutter member is in its closed position, and a slide for causing said sealing means to pass between a retracted position which is also a rest position in which the sealing means is spaced apart from the spherical shutter member, and a contact position in which the gasket is pressed against the shutter member, wherein the valve includes a first resilient element of low stiffness which, when the valve is brought to its open position tends to separate the sealing means from the shutter member, and a second resilient element of relatively greater stiffness which is put under tension by the slide a few degrees before the mechanical closure position of the valve when the gasket is in contact with the shutter member, and which exerts controlled pressure on said gasket in contact with the shutter member.

2. A valve according to claim 1, wherein the sealing means includes a gasket support receiving the annular gasket and connected to the valve body by the low stiffness first resilient element whose action in the longitudinal direction of the upstream and downstream ducts tends to separate the gasket from the shutter member and which simultaneously provides sealing between the gasket support and the valve body.

3. A valve according to claim 2, wherein the slide includes a first ring extended axially by two resilient arms of relatively greater stiffness extending in the longitudinal direction of the upstream and downstream ducts and on either side of the ball, and having free ends that are terminated by hooks, the inside faces of said hooks being designed to co-operate with the rear end of the gasket support.

4. A valve according to claim 3, wherein the gasket support is provided with notches for co-operating with the hooks to form an assembly of the bayonet type for the purpose of allowing the slide to act on the gasket support.

5. A valve according to claim 3, wherein the resilient arms of the slide include notches extending substantially parallel to the axis of a shaft for rotating the spherical shutter member and opening out alternately into opposite top and bottom edges of the arms.

6. A valve according to claim 3, wherein the resilient arms of the slide include corrugations that are crinkled in shape.

7. A valve according to claim 2, wherein the slide includes a first ring which is axially extended by two resilient arms of relatively greater stiffness extending in the longitudinal direction of the upstream and downstream ducts and on either side of the ball and having free ends connected to a second ring having a threaded inside portion designed to co-operate with a threaded outside portion of the gasket support.

8. A valve according to claim 7, wherein the resilient arms of the slide include notches extending substantially parallel to the axis of a shaft for rotating the spherical shutter member and opening out alternately into opposite top and bottom edges of the arms.

9. A valve according to claim 7, wherein the resilient arms of the slide include corrugations that are crinkled in shape.

10. A valve according to claim 1, wherein the sealing means includes a gasket support receiving the annular gasket and connected to the valve body by means of the low stiffness first resilient element, the relatively greater stiffness second resilient element being constituted by a coil spring disposed between the gasket support and hooks formed at the free ends of the two arms of the slide disposed in the longitudinal direction of the upstream and downstream ducts.

11. A valve according to claim 1, wherein the sealing means include a gasket support receiving the annular gasket and connected to a link ring by the relatively greater stiffness second resilient element, the low stiffness first resilient element connecting the valve body to said link ring which is designed to co-operate with the slide.

12. A valve according to claim 1, wherein the sealing means includes a gasket support receiving the annular gasket and connected to the valve body by means of the low stiffness first resilient element, and wherein the first resilient element is a resilient bellows whose drive in the longitudinal direction of the upstream and downstream ducts tends to separate the gasket from the shutter member and which simultaneously provides sealing between the gasket carrier and the valve body.

13. A valve according to claim 11, wherein the second resilient element is a resilient bellows compressible in the longitudinal direction of the upstream and downstream ducts.

14. A valve according to claim 11, wherein the second resilient element is constituted by a low stiffness resilient bellows on which a coil spring is mounted in parallel, the assembly constituting the resilient element of relatively greater stiffness.

15. A valve according to claim 11, wherein said first and second resilient elements co-operating with the link ring are constituted by a one-piece bellows including two elements of different stiffnesses.

16. A valve according to claim 1, wherein when the shutter member is displaced from its open position to its closed position by rotating a drive shaft, at least one cam secured to said shutter member has an end that comes into contact with an inside face of the ring of the slide to move it in a longitudinal direction of the upstream and downstream ducts, thereby stretching the first resilient elements and causing the gasket to be pressed against the shutter member under drive from the second resilient element, whereas when the shutter member is moved from its closed position to its open position, the cam(s), on losing contact with the ring, cause the gasket to be retracted from the shutter member under the effect of the first resilient element returning to its initial, rest position.

17. A valve according to claim 1, wherein the slide is moved by means of at least one wheel mounted on eccentric bearings carried by the drive shaft.

18. A valve according to claim 1, wherein the valve body includes a plane window extending perpendicularly to the axis of the drive shaft for rotating the shutter member, thereby allowing the ball to be extracted without requiring the valve to be removed.

* * * * *

UNITED STATES PATENT AND TRADEMARK OFFICE
CERTIFICATE OF CORRECTION

PATENT NO. : 5,253,843
DATED : October 19, 1993
INVENTOR(S) : Patrick Garceau

It is certified that error appears in the above-indentified patent and that said Letters Patent is hereby corrected as shown below:

Column 7, line 67, "lind ring" should read --link ring--.

Signed and Sealed this

Twentieth Day of September, 1994

Attest:

BRUCE LEHMAN

Attesting Officer    Commissioner of Patents and Trademarks